US012725980B2

(12) United States Patent
Orbay et al.

(10) Patent No.: US 12,725,980 B2
(45) Date of Patent: Sep. 1, 2026

(54) GROUNDING DEVICE FOR A VEHICLE AND VEHICLE

(71) Applicant: Volvo Car Corporation, Gothenburg (SE)

(72) Inventors: Raik Orbay, Gothenburg (SE); Ida Andersson, Gothenburg (SE); Magnus Bratt, Gothenburg (SE); Catarina Ekelund, Gothenburg (SE); Rasmus Hägg, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 392 days.

(21) Appl. No.: 18/450,651

(22) Filed: Aug. 16, 2023

(65) Prior Publication Data

US 2024/0063581 A1 Feb. 22, 2024

(30) Foreign Application Priority Data

Aug. 17, 2022 (EP) .................................... 22190712

(51) Int. Cl.
*H01R 24/56* (2011.01)
*H01R 4/48* (2006.01)
*H01R 13/652* (2006.01)

(52) U.S. Cl.
CPC ......... *H01R 13/652* (2013.01); *H01R 4/4854* (2013.01); *H01R 24/56* (2013.01); *H01R 2201/26* (2013.01)

(58) Field of Classification Search
CPC .... H01R 13/652; H01R 4/4854; H01R 24/56; H01R 2201/26
See application file for complete search history.

(56) References Cited

U.S. PATENT DOCUMENTS 5,491,892 A 2/1996 Fritz et al.
6,815,610 B2 * 11/2004 Kuboshima ........ H01R 13/6593 439/98

(Continued)

FOREIGN PATENT DOCUMENTS

WO 2015183133 A1 12/2015

OTHER PUBLICATIONS

Eriflex, "Flexible Conductors Solutions to Optimize the Design of Electrical Power & Ground Connections(North America)", ERICO, Jun. 25, 2016, 52 pages.

(Continued)

*Primary Examiner* — Thanh Tam T Le
(74) *Attorney, Agent, or Firm* — Amin, Turocy & Watson, LLP

(57) ABSTRACT

A grounding device for a vehicle can comprise a conducting element and two contact elements, wherein the conducting element comprises at least one flat braided wire assembly configured to conduct high frequency currents, wherein a first contact element of the two contact elements is arranged at a first axial end of the conducting element and a second contact element of the two contact elements is arranged at a second axial end of the conducting element, wherein the first contact element is further configured to be attached to a first component of the vehicle, and the second contact element is further configured to be attached to a second component of the vehicle, and wherein the conducting element is formed at least partly as a spring element, configured to provide an elastic expansion or an elastic compression in at least two dimensions.

20 Claims, 3 Drawing Sheets

(56) References Cited

U.S. PATENT DOCUMENTS

| | | | | |
|---|---|---|---|---|
| 7,628,650 | B2 * | 12/2009 | Aoki | H01R 13/748 439/607.28 |
| 7,726,985 | B2 * | 6/2010 | Gladd | H01R 9/0518 439/585 |
| 8,895,875 | B2 * | 11/2014 | Kato | H05K 9/00 174/359 |
| 9,345,180 | B2 * | 5/2016 | Adachi | H05K 9/0098 |
| 9,386,733 | B2 * | 7/2016 | Adachi | H01R 13/6599 |
| 9,622,393 | B2 * | 4/2017 | Imahori | H05K 9/0098 |
| 9,666,955 | B2 * | 5/2017 | Sugino | B60R 16/0215 |
| 9,991,026 | B2 * | 6/2018 | Kanagawa | H01B 13/0036 |
| 10,056,702 | B2 * | 8/2018 | de la Garza Fernandez | H01R 4/184 |
| 10,181,660 | B2 * | 1/2019 | Zagroun | H01R 4/58 |
| 10,381,793 | B2 * | 8/2019 | Naganishi | H01B 5/12 |
| 10,930,413 | B2 * | 2/2021 | Kitahara | H02G 3/0616 |
| 11,525,423 | B2 * | 12/2022 | Orbay | F02M 26/22 |
| 12,113,322 | B2 * | 10/2024 | Izawa | B60R 16/0215 |
| 2009/0027257 | A1 | 1/2009 | Arikan et al. | |
| 2009/0272570 | A1 | 11/2009 | Chen | |
| 2010/0319989 | A1 | 12/2010 | Huang et al. | |
| 2019/0101177 | A1 | 4/2019 | Parnoutsoukian et al. | |
| 2021/0351535 | A1 | 11/2021 | Franco Núñez et al. | |

OTHER PUBLICATIONS

Extended European Search Report received for European Application Serial No. 22190712.4 dated Feb. 9, 2022, 12 pages.

* cited by examiner

GROUNDING DEVICE FOR A VEHICLE AND VEHICLE

CROSS-REFERENCE TO RELATED APPLICATIONS

This application claims the benefit of and priority to pending EP patent application serial number 22190712.4, filed Aug. 17, 2022, and entitled "GROUNDING DEVICE FOR A VEHICLE AND VEHICLE," the entirety of which is hereby incorporated by reference herein.

TECHNICAL FIELD

The present disclosure relates to a grounding device for electrically connecting at least two components of a vehicle, a vehicle, and a use of a grounding device for a vehicle.

BACKGROUND

The number of electronic devices, components etc. in vehicles and their frequency span have increased, resulting in that electromagnetic compatibility in vehicles becoming more and more important. Thus, several electromagnetic interference measures have been taken to secure a vehicle's performance, such as ground circuits, systems and/or component designs to attenuate certain frequencies, heavy ferrites for suppressing electromagnetic interference (EMI), random pulse width modulation, random pulse position modulation, attenuating materials in the body-in-white (BIW), and/or slip rings in electric motors.

Presently used grounding components, device etc. are usually based on arbitrarily shaped braids, and therefore have lifetime issues, because braids are prone to wear, tear, rupture and/or corrosion.

SUMMARY

There is thus a need to provide an improved grounding device for a vehicle, particularly a grounding device having an increased lifetime and/or having an improved resistance to mechanical loads and/or environmental influences.

The object of the present disclosure is at least partially solved or alleviated by the subject-matter of the appended independent claims, wherein further embodiments are incorporated in the dependent claims.

According to a first aspect, there is provided a grounding device for electrically connecting at least two components of a vehicle. The grounding device comprises: a conducting means and two contact elements. The conducting means comprises at least one flat braided wire assembly configured to conduct high frequency current, particularly surface currents. A first contact element of the two contact elements is arranged at a first axial end of the conducting means and a second contact element of the two contact elements is arranged at a second, particularly opposite, axial end of the conducting means. Further, the first contact element is configured to be attached to a first component of the vehicle, and the second contact element is configured to be attached to a second, particularly separate, component of the vehicle. The conducting means is formed at least partly as a spring element configured to provide an elastic expansion and/or an elastic compression in at least two dimensions, e.g., in the axial direction of the spring element as well as in an oblique direction thereof.

In other words, the grounding device is like a connecting device for electrically connecting at least two components of a vehicle, and in particular, for providing a low impedance current path between at least two components of the vehicle, wherein the components are separate from each other, e.g., a housing of an electric motor of the vehicle as a first component and a vehicle subframe as a second component. The flat braided wire assembly in the conducting means allows conducting high frequency current, and thus fulfils alternate current (AC) grounding needs. The high frequency current includes surface current, which may vary dependent on upstream geometries, materials, gaps and/or additional capacitances and/or inductances, particularly of the flat braid wire assembly.

By forming the conducting means at least partly as a spring element, the resistance of the grounding device, and particularly of the flat braid wire assembly, to mechanical loads is improved. In detail, the spring-like form is a stable form while still providing elastic expansion and/or elastic compression of the conducting means in at least two dimensions. This means that the spring element is elastically expandable and/or compressible without being twisted, and particularly, without twisting spring turns. Therefore, the spring-like form allows preventing the flat braid wire assembly from being twisted and/or looped due to mechanical loads. In other words, the spring element allows protecting the flat braid wire assembly from critical mechanical loads, e.g., loads leading to looping of the flat braid wire assembly, thereby prolonging the lifetime of the flat braid wire assembly, particularly compared to known flat braid wire assemblies having a tape-like, flexible or erratically changing shape under loads.

The contact elements are configured to connect the conducting means with the at least two vehicle components. Such connection includes various connecting mechanisms, such as a bolt connection, a clamp connection etc., as well as a contacting connection, in which the contact elements only contact the components, respectively, while the conducting means is in a predetermined, particularly biased or compressed state, thereby pushing the contact elements into contact with the components, respectively, even while the components are vibrating and/or moving relative to each other. Further, the contact elements are configured to ensure a low impedance path for surface currents between the conducting means and the respective component. A groove being provided on each vehicle component and configured to accommodate or hold at least the respective contact element of the grounding device may also help in establishing such a secure, low impedance surface current path.

According to an example, the spring element may be formed as a wave spring or a compression spring, particularly a coil spring. Wave springs as well as coil springs may allow being expanded and/or compressed in at least two dimensions. Compression springs are usually formed from substantially round or oval spring steel wire and available in substantially all possible sizes.

Since compression springs are very common, they are usually manufactured in large quantities and therefore, low cost. Wave springs are already used in various suspension systems and are capable to provide sufficient flexibility to ensure contact to the moving and/or vibrating components. Wave springs are usually made of wound flat wire and the spring effect is based on the incorporated waves. Further, wave springs may allow a reduced installation height, particularly up to 50% compared to conventional compression springs for static to medium dynamic applications. In other words, due to their configuration, wave springs may be able to generate the same force as a compression spring, but with a reduced installation height. Thus, from a packaging point of view, providing the same characteristics while needing a reduced installation height may be advantageous, since such spring may allow a reduced installation space. Additionally, the in-built shape of the wave spring may prevent the usually unintendingly or arbitrarily formed electromagnetic compatibility (EMC) couplings, such as the flat braid wire assembly, from bending, from wear by rubbing to other components or itself, and/or from wear by scraping. Furthermore, the wave spring may have a wider tolerance for packaging, particularly into a vehicle, and therefore, may allow using the same size of wave spring for various, particularly substantially all, connections of at least two components of the vehicle. In other words, the wave spring may be a "one-fits-all"-spring element, providing a cost-efficient, thus economical, grounding device. Additionally, as the wave springs provide a stable, predetermined or fixed shape, they may be connected in series, as well as parallel as allowed by the EMC and grounding dimensioning and/or depending on the assembly requirements.

According to an example, the connecting body may further comprise a coating enclosing the conducting means, the coating being configured to protect the conducting means from environmental influences, such as pollutants in air, water, moisture, etc. thereby contributing to a galvanic insulation of the flat brad wire assembly.

The conducting means may be located inside the coating, such that the coating may protect the conducting means from environmental influences. Thus, the coating may prevent the conducting means, and particularly the flat braid wire assembly from corroding due to environmental influences, and thereby further increasing (prolonging) the lifetime of the conducting means. The prolonged lifetime may assure high quality EMC compatibility and reduce servicing costs for the end user, supporting a circular economy for transport electrification. Further, the coating may reduce inter-wave wear for the spring element.

According to an example, the coating may further enclose a sacrificial anode, e.g., made of zinc, which may be configured to prevent corrosion, particularly galvanic corrosion of the conducting means.

The sacrificial anode, or galvanic anode, may be made of a base metal, that is, a metal or a metal alloy having a more negative reduction potential and a more positive electrode potential, respectively, than the metal material of the flat braid wire assembly. The difference in potential between the metals of the sacrificial anode and the flat brad wire assembly means that the sacrificial anode corrodes instead of the flat braid wire assembly. Thus, by integrating a sacrificial anode, the conducting means, particularly the flat braid wire assembly, may be protected from galvanic corrosion.

According to an example, the coating may be formed of a metal, particularly of spring steel, or a metal alloy. According to an example, the coating may be formed of a plastic, particularly of a reinforced plastic.

Metal, particularly spring steel, may result in good spring characteristics, wherein plastics may provide an insulating effect.

According to an example, the contact elements may be formed as separate elements, e.g., eyelets, exposed braid strands, pressed & sintered braid strands, and may be conductively connected to the conducting means for minimizing the contact electrical resistance. According to an example, the contact elements may be integrally formed with the conducting means.

The separate contact elements may be stiff and made of a robust material. The contact elements integrally formed with the conducting means, may be part of the conducting means, particularly of the flat braid wire assembly to allow for the surface currents to flow the low impedance path through the conducting means from one component to the other component of the vehicle. The choice of the contact element being separately or integrally formed with the conducting means may depend on the application, that is, it may depend on the number, location and/or type of components to be connected by the grounding device. These components may be formed as connected elements, e.g., eyelets, exposed braid strands, pressed & sintered braid strands, precious metal contact at braid strand tips, punched braid strands, etc.

According to an example, the contact elements may be a spring turn configured to be positioned in a recess, such as a groove, being formed on the first and/or the second component of the vehicle. This may reduce the manufacturing costs and/or the weight of the grounding device, particularly compared to using separate contact elements, such as two bolts and washer at each side of the conducting means.

By positioning the contact elements in a recess, the grounding device, particularly the conducting means may be arranged in a biased or compressed state, and the recess, such as a groove, may prevent the grounding device from moving relative to a contact surface of the component due to the component's movement and/or vibration. Such compressed configuration may also assure a low impedance path from the conducting means to the vehicle component. The contact surface may be a surface of the component comprising the recess and being in contact with one contact element of the grounding device, in an assembled state.

According to an example, the contact elements may be configured to be removably connected to at least one fixture of the first and/or the second component. A removable connection, or a detachable connection, may allow replacing the contact element and/or the grounding device in case of failure, such as excessive wear, corrosion, etc. The fixture may be formed as the recess. Alternatively, the fixture may be a device being casted onto the component, configured to hold the contact element in place, e.g., a mounting bracket etc.

According to an example, the grounding device may further comprise at least a solid metal part configured to conduct low frequency current. The solid metal part may allow conducting low frequency current, and thus fulfils direct current (DC) grounding needs. Since the flat braid wire assembly may allow conducting high frequency current, particularly better than single strand wire, the solid metal part may allow additionally conducting low frequency current, thereby enabling the grounding device to conduct both, high frequency current and low frequency current. In other words, such grounding device combines the function of conducting low frequency current and high frequency current in one device.

According to an example, the solid metal part may be formed as a second spring element configured to provide an elastic expansion and/or an elastic compression in at least two dimensions, e.g., the axial direction of the spring element as well as in an oblique direction thereof. Thus, the grounding device may comprise a two-spring-aggregation, the one spring element being configured to conduct the high frequency current, and the other spring element being configured to conduct the low frequency current. Such grounding device may not need to compromise on a material which may allow conducting both, high frequency current and low frequency current, but may provide one spring element being adapted, particularly tailored, to conduct the high frequency current effectively and efficiently, and one spring element being adapted, particularly tailored, to effectively and efficiently conduct the low frequency current. According to an example, the second current path may be formed as a solid wire.

According to an example, the second spring element may be formed as a wave spring or a compression spring, particularly a coil spring. Wave springs as well as coil springs may allow being expanded and/or compressed in at least two dimensions. Compression springs are usually formed from substantially round or oval spring steel wire and available in substantially all possible sizes.

Since compression springs are very common, they are usually manufactured in large quantities and therefore, low cost. Wave springs are already used in various suspension systems and are capable to provide sufficient flexibility to ensure contact to the moving and/or vibrating components. Wave springs are usually made of wound flat wire and the spring effect is based on the incorporated waves. Further, wave springs may allow a reduced installation height, particularly up to 50% compared to conventional compression springs for static to medium dynamic applications. In other words, due to their configuration, wave springs may be able to generate the same force as a compression spring, but with a reduced installation height. Additionally, the in-built shape of the wave spring may prevent the arbitrarily or alternatively shaped electromagnetic compatibility (EMC) couplings, such as the flat braid wire assembly, from bending, from wear by rubbing to other components or itself, and/or from wear by scraping.

According to a second aspect, there is provided a vehicle, comprising: at least a first component and a second component, and a grounding device according to the first aspect, the grounding device being configured to provide a conductive path, particularly at least a low impedance path, between at least the first component and the second component.

Therefore, the grounding device allows conductively connecting at least the first component and the second component, and increases the lifetime of such connection, in particular in view of conducting high frequency current. Further, the grounding device may be able to additionally conduct low frequency current.

According to a third aspect, there is provided a use of the grounding device according to the first aspect for providing a conductive path between at least a first component and a second component of a vehicle, the conductive path being configured to conduct high frequency current.

The resistance of the grounding device, and particularly of the flat braid wire assembly, to mechanical loads is improved. In detail, the spring-like form provides elastic expansion and/or elastic compression of the conducting means in at least two dimensions without twisting the spring element, and particularly, spring turns. Therefore, the spring-like form allows preventing the flat braid wire assembly, which allows conducting the high frequency current, from being twisted and/or looped due to mechanical loads. In other words, the grounding device, and in particularly the spring element, allows protecting the flat braid wire assembly from critical mechanical loads, e.g., loads leading to looping of the flat braid wire assembly, thereby prolonging the lifetime of the flat braid wire assembly.

It should be noted that the above examples may be combined with each other irrespective of the aspect involved.

These and other aspects of the present disclosure will become apparent from and elucidated with reference to the embodiments described hereinafter.

BRIEF DESCRIPTION OF DRAWINGS

Exemplary embodiments of the disclosure will be described in the following with reference to the following drawings. Figures are for illustration purposes and are not to scale.

FIG. 4A shows a schematic exemplary cross-sectional view of the grounding device in

FIG. 3.

FIG. 4B shows a schematic exemplary cross-sectional view of the grounding device in

FIG. 3.

DETAILED DESCRIPTION

Figure 1A:
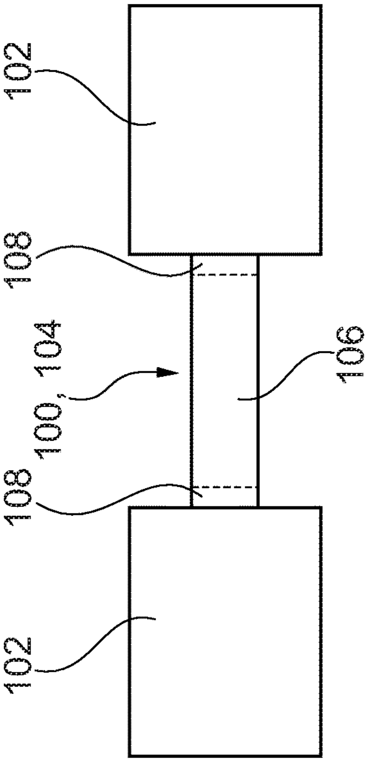
FIG. 1A shows a schematic block diagram of two components of a vehicle being connected by an exemplary grounding device.
Figure 1B:
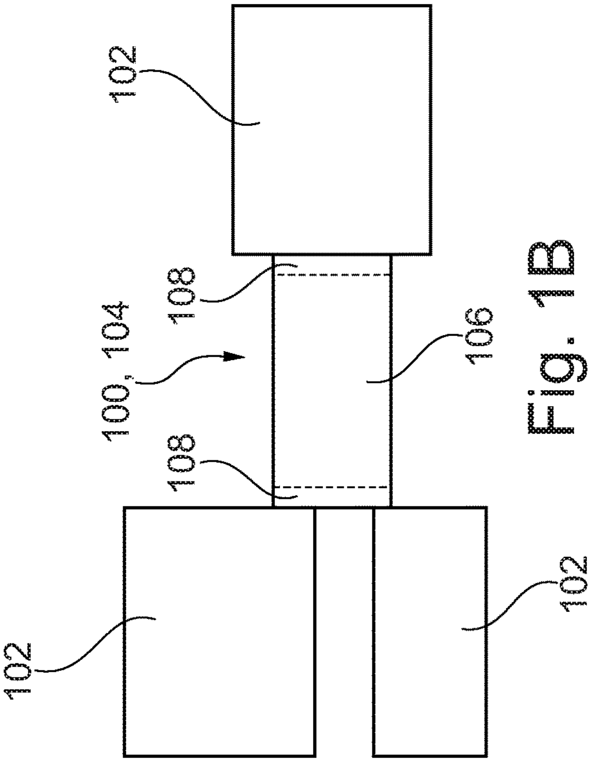
FIG. 1B shows a schematic block diagram of three components of a vehicle being connected by an exemplary grounding device.

FIGS. 1A and 1B shows a schematic block diagram of an example of a grounding device 100 electrically connecting two components 102 (FIG. 1A) and three components 102 (FIG. 1B), respectively, of a vehicle (not shown). The components 102 may be electric components or may comprise at least an electric part. The grounding device 100 is configured to electrically and/or galvanically connect the components 102 to form a grounding circuit, and thereby reduce and/or substantially eliminate the electromagnetic interference (EMI) and thus fulfilling the requirements regarding electromagnetic compatibility (EMC) in a vehicle.

The grounding device 100 comprises a conducting means 106 and two contact elements 108. The conducting means 106 and the contact elements 108 may be integrally formed or separately formed. Each of the contact elements 108 is in contact with at least one component 102. The conducting means 106 is configured to conduct at least high frequency current, and therefore comprises a flat braid wire assembly 110 (e.g., see FIG. 2). The flat braid wire assembly 110 comprises at least one, preferably two, three, four or more, flat braid wires.

During operation, e.g., while the vehicle is driven, the components 102 may move and/or vibrate, particularly relative to each other so that the grounding device 100 needs to be flexible enough to compensate such movements and/or vibrations without losing contact to the components 102.

Figure 2:
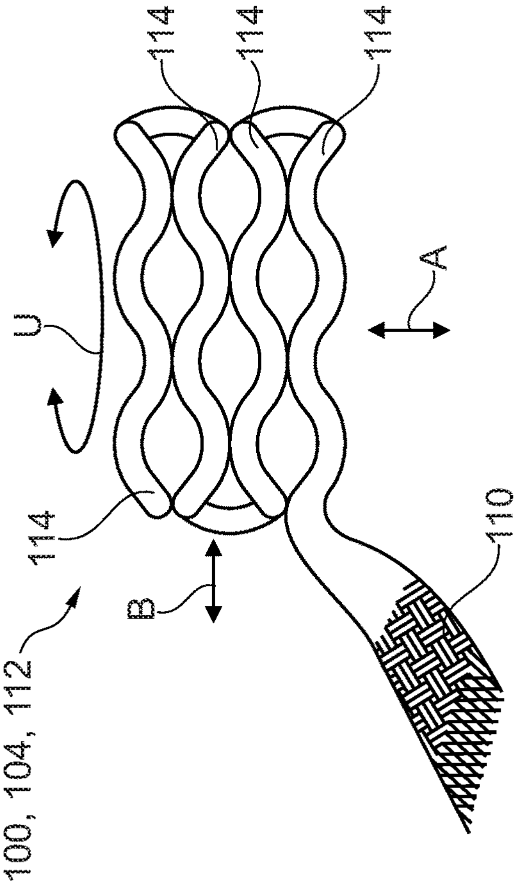
FIG. 2 shows a schematic view of an exemplary grounding device.
Figure 3:
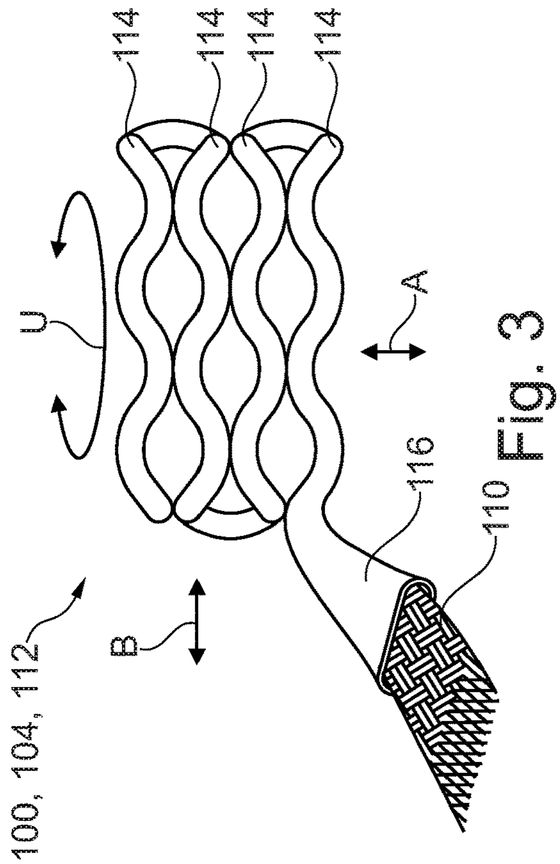
FIG. 3 shows a schematic view of an exemplary grounding device.
Figure 5:
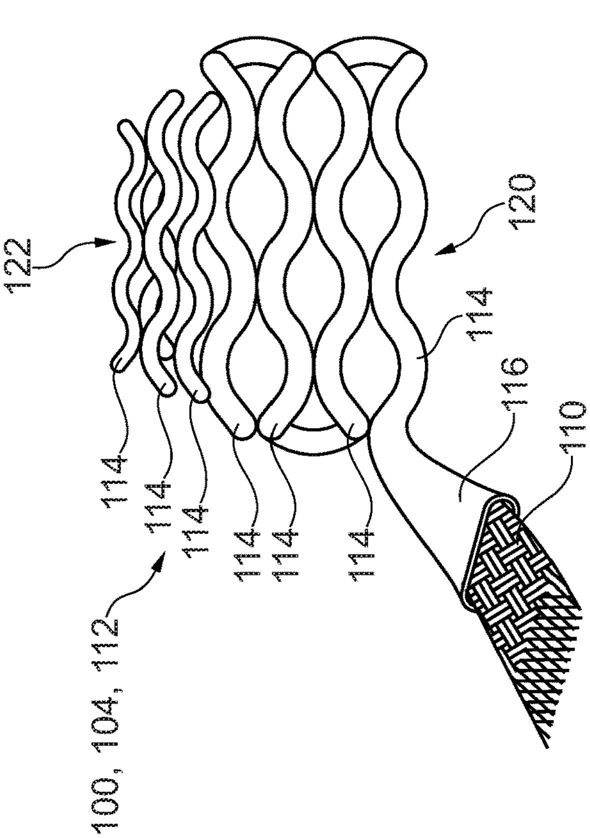
FIG. 5 shows a schematic view of an exemplary grounding device.

FIGS. 2, 3 and 5 show schematic views of an exemplary grounding device 100, in which the conducting means 106 and the contact elements 108 are integrally formed as a wave spring 112. The wave spring 112 is formed of wound flat wire(s) which is/are formed in wave along a circumferential direction U. The wave spring 112 allows elastic expansion and/or compression in at least two dimensions, e.g., in the axial direction A and in an oblique direction thereof, e.g., such that the wave spring 112 is bend and/or compressed in a direction B substantially orthogonal to the direction A.

In the example shown in FIG. 2, the wave spring 112 comprises four spring turns 114, and is substantially formed of the flat braid wire assembly 110. The flat braid wire assembly 110 is configured to conduct high frequency current. However, the flat braid wire assembly 110 is prone to mechanical loads, and in particular, to twisting loads. The particularly pre-determined or characteristic and stable form of the wave spring 112 prevents the flat braid wire assembly 110 from being twisted, thereby increasing lifetime of the flat braid wire assembly 110.

Figure 4A:
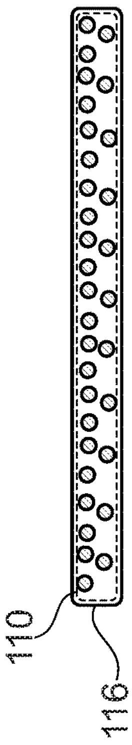
Figure 4B:
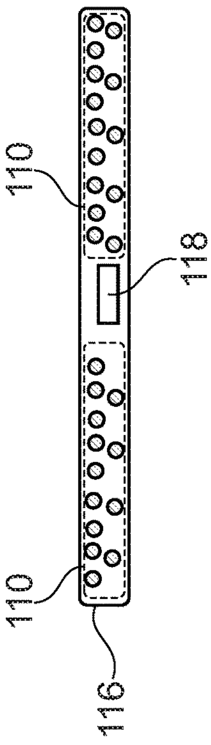

In the example shown in FIG. 3, the wave spring 112 comprises four spring turns 114, and is substantially formed of the flat braid wire assembly 110, which is enclosed by a coating 116. The coating 116 may be made of a metal or a metal alloy, such as spring steel, or may be made of a plastic, such as a reinforced plastic. The coating 116 encloses the flat braid wire assembly 110 entirely (see also FIGS. 4A and 4B), thereby protecting the flat braid wire assembly 110 from external and/or environmental influences, such as water, dust, air etc. In other words, the coating protects the flat braid wire assembly 110 from the environmental influences and therefore, prevents the flat braid wire assembly 110 from corroding. Further, as exemplary shown in FIG. 4B, a sacrificial anode 118 may be enclosed by the coating, thereby reducing, or eliminating the galvanic corrosion, which may occur, particularly in case, the coating is made of metal or metal alloy.

The example shown in FIG. 5 substantially corresponds to the example shown in FIG. 3, except that the wave spring 112 comprises seven spring turns, which have different diameters, such that the wave spring 112 has a cone-like configuration. Such a cone-like formed wave spring 112 may be used for connecting three components 102 (see FIG. 1B), two of which are arranged on the same side of the grounding device 100 and in contact with a large base 120 of the wave spring 112 and one of which is arranged on another, particularly opposite, side of the grounding device 100 and in contact with the "tip" 122 of the cone-like wave spring 112. Although not shown in the Figures, it is possible that the wave spring may have other diameter-variable shapes, such as hourglass-shaped, in which the "tips" of two cones are contacting each other, or a shape having smaller diameters at the axial ends of the wave spring than in the center of the wave spring etc.

Figure 6:
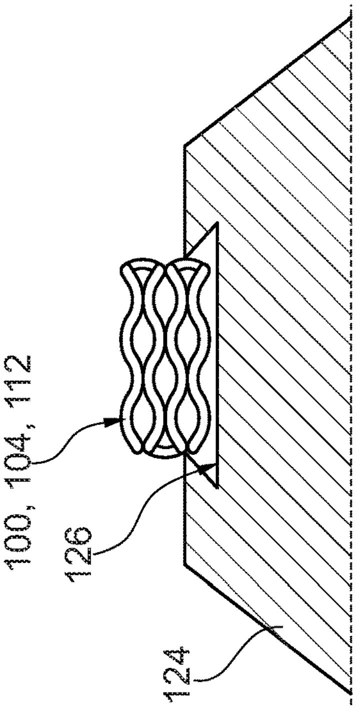
FIG. 6 shows a schematic view of an exemplary fixture holding a grounding device.

FIG. 6 shows a schematic, cross-sectional view of an example of a fixture 124 holding the grounding device 100. The fixture 124 may be casted onto the respective component 102 and provides a groove 126 for accommodating one contact element 108 of the grounding device 100, wherein the contact element 108 is formed as a spring turn 114 of the wave spring 112. The groove 126 has a protruding rim 130, which protrudes towards the contact element 108, when being placed in the groove 126, preventing the contact element 108 from easily falling out of the groove 126. The rim 130 may be sectionally formed, particularly as clamp-like or bracket-like fixtures (see FIG. 7A). Alternatively, the rim 130 may be at least partly formed along the circumference of the groove 126, e.g., as shown in FIG. 7B, particularly to aid in assuring the needed contact area for surface currents.

Figure 7B:
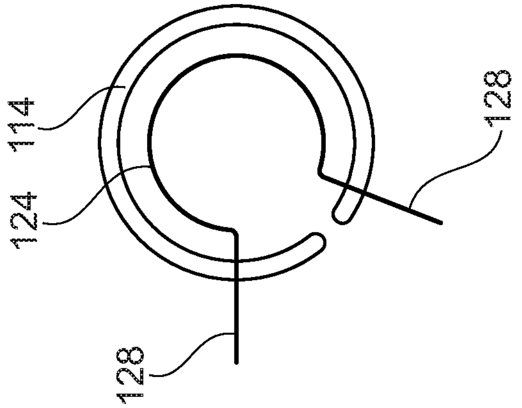
FIG. 7B shows a schematic, perspective view of an exemplary fixture holding a grounding device The figures are merely schematic representations and serve only to illustrate embodiments of the disclosure. Identical or equivalent elements are in principle provided with the same reference signs.
Figure 7A:
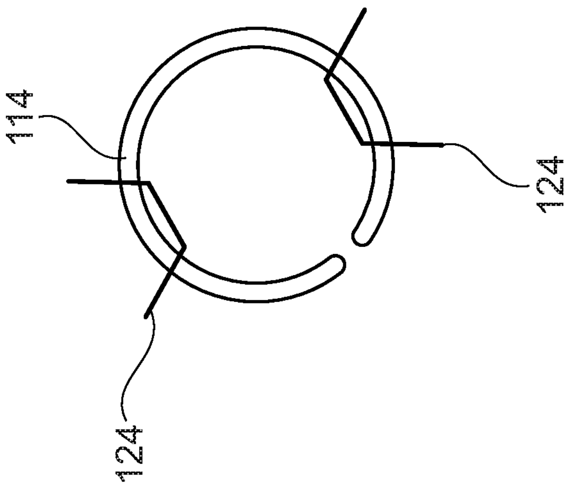
FIG. 7A shows a schematic, perspective view of an exemplary fixture holding a grounding device.

FIGS. 7A and 7B each shows a schematic, perspective view of an example of a fixture 124 holding the grounding device 100. The contact element 108 is formed as a spring turn 114 or an outer wave of the wave spring 112, which is placed in the groove 126 (see FIG. 6) formed in the component 102. Further the spring turn 114 is fixed/hold in the groove 126 by two clamp-like or bracket-like fixtures 124 (see FIG. 7A) providing an easy-fit low impedance connection between the spring turn 114 and the respective component 102.

Alternatively, as shown in FIG. 7B, the spring turn 114 is hold in the groove 126 by one bracket-like fixture 124, which is formed at least partly circular having legs 128 at respective two ends of the open circle crossing the spring turn and thereby providing a low impedance path between the component 102 and the spring turn 114. The rim 130 and/or the bracket- or clamp-like fixtures 124 may assure a conductive connection between the contact elements 108 and the respective component 102 to provide the low impedance path between the contact elements 108 and the respective component 102.

Other variations to the disclosed embodiments can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. Any reference signs in the claims should not be construed as limiting the scope of the claims.

LIST OF REFERENCE SIGNS

100 grounding device
102 component
106 first conducting member
108 contact element
110 flat braid wire assembly
112 wave spring
114 spring turn
116 coating
118 sacrificial anode
120 base
122 tip
124 fixture
126 groove
128 leg
130 rim
A axial direction
B direction
U circumferential direction

What is claimed is:

1. A grounding device for a vehicle, comprising:
a conducting element and two contact elements,
wherein the conducting element comprises a flat braided wire assembly configured to conduct high frequency currents,
wherein a first contact element of the two contact elements is arranged at a first axial end of the conducting element and a second contact element of the two contact elements is arranged at a second axial end of the conducting element, wherein the first contact element is further configured to be attached to a first component of the vehicle, and the second contact element is further configured to be attached to a second component of the vehicle, and wherein the flat braided wire assembly of the conducting element is formed at least partly as a spring element, the spring element being in a stable form configured to provide at least one of an elastic expansion or an elastic compression in at least two dimensions while preventing the flat braided wire assembly from being at least one of twisted or looped due to mechanical loads.

2. The grounding device of claim 1, wherein the spring element is formed as a wave spring.

3. The grounding device of claim 1, further comprising:

a coating enclosing the conducting element, wherein the coating is configured to protect the conducting element from environmental influences comprising air or water.

4. The grounding device of claim 3, wherein the coating further encloses a sacrificial anode configured to prevent corrosion of the conducting element.

5. The grounding device of claim 3, wherein the coating is formed of at least a metal, or metal alloys.

6. The grounding device of claim 3, wherein the coating is formed of a plastic.

7. The grounding device of claim 1, wherein the contact elements comprise separate elements and are conductively connected to the conducting element.

8. The grounding device of claim 1, wherein the contact elements are integrally formed with the conducting element.

9. The grounding device of claim 8, wherein the contact elements comprise a spring turn configured to be positioned in a recess being formed on the first component of the vehicle or the second component of the vehicle.

10. The grounding device of claim 1, wherein the contact elements are configured to be removably connected to at least one fixture of the first or the second component.

11. The grounding device of claim 1, further comprising:

at least a solid metal part configured to conduct low frequency current.

12. The grounding device of claim 11, wherein the solid metal part is formed as a separate spring element configured to provide an elastic expansion or an elastic compression in at least two dimensions.

13. The grounding device of claim 12, wherein the separate spring element is formed as a wave spring.

14. A vehicle, comprising:

at least a first component and a second component; and a grounding device, comprising:

a conducting element and two contact elements, wherein the conducting element comprises a flat braided wire assembly configured to conduct high frequency currents, wherein a first contact element of the two contact elements is arranged at a first axial end of the conducting element and a second contact element of the two contact elements is arranged at a second axial end of the conducting element, wherein the first contact element is further configured to be attached to the first component of the vehicle, and the second contact element is further configured to be attached to the second component of the vehicle, and wherein the flat braided wire assembly of the conducting element is formed at least partly as a spring element, the spring element being in a stable form configured to provide at least one of an elastic expansion or an elastic compression in at least two dimensions while preventing the flat braided wire assembly from being at least one of twisted or looped due to mechanical loads, and wherein the grounding device is configured to provide a conductive path, comprising a low impedance path, between at least the first component and the second component.

15. The vehicle of claim 14, wherein the spring element is formed as a wave spring.

16. The vehicle of claim 14, wherein the grounding device further comprises:

a coating enclosing the conducting element, wherein the coating is configured to protect the conducting element from environmental influences comprising air or water.

17. The vehicle of claim 16, wherein the coating further encloses a sacrificial anode configured to prevent corrosion of the conducting element.

18. The vehicle of claim 16, wherein the coating is formed of at least a metal, or metal alloys.

19. The vehicle of claim 16, wherein the coating is formed of a plastic.

20. A method, comprising:

providing a conductive path between at least a first component and a second component of a vehicle, the conductive path being configured to conduct high frequency current, wherein the vehicle comprises:

a grounding device, comprising:

a conducting element and two contact elements, wherein the conducting element comprises a flat braided wire assembly configured to conduct high frequency currents, wherein a first contact element of the two contact elements is arranged at a first axial end of the conducting element and a second contact element of the two contact elements is arranged at a second axial end of the conducting element, wherein the first contact element is further configured to be attached to the first component of the vehicle, and the second contact element is further configured to be attached to the second component of the vehicle, and wherein the flat braided wire assembly of the conducting element is formed at least partly as a spring element, the spring element being in a stable form configured to provide at least one of an elastic expansion or an elastic compression in at least two dimensions while preventing the flat braided wire assembly from being at least one of twisted or looped due to mechanical loads, and wherein the grounding device is configured to provide the conductive path, comprising a low impedance path, between at least the first component and the second component.

* * * * *